United States Patent [19]

Kingston et al.

[11] 4,441,194
[45] Apr. 3, 1984

[54] TRIPLE BIT NON-COHERENT MATCHED FILTER RECEIVING SYSTEM

[75] Inventors: Samuel C. Kingston, Salt Lake City; Billie M. Spencer, Bountiful; John W. Zscheile, Jr., Farmington, all of Utah; Robert Price, Lexington, Mass.

[73] Assignee: Sperry Corporation, New York, N.Y.

[21] Appl. No.: 379,597

[22] Filed: May 19, 1982

[51] Int. Cl.³ .............................................. H03D 3/06
[52] U.S. Cl. ...................................... 375/96; 329/104; 364/715
[58] Field of Search ......................... 375/1, 94, 95, 96; 328/147, 149; 329/104, 105; 364/724, 554, 715

[56] References Cited

U.S. PATENT DOCUMENTS

| | | | |
|---|---|---|---|
| 4,100,378 | 7/1978 | Classen et al. | 375/96 |
| 4,185,172 | 1/1980 | Melindo et al. | 375/96 |
| 4,379,349 | 4/1983 | Girardi et al. | 375/94 |

Primary Examiner—Robert L. Griffin
Assistant Examiner—Stephen Chin
Attorney, Agent, or Firm—John B. Sowell; Kenneth T. Grace; Marshall M. Truex

[57] ABSTRACT

A non-coherent receiving system is provided with a novel triple-bit matched filter detector system which provides two outputs indicative of the data stream being detected. A preliminary or soft decision is made concerning the state of the bits in the data stream. One of the outputs provides a best estimate of state of the data bit being detected and the other output provides the second best estimate of the state of the data bits being detected. The incoming data stream is processed and modified as it is shifted through a plurality of shift registers in real time employing the data bits subsequently detected. A controller is provided to make a plurality of predetermined evaluations of the state of the bits in the data stream and to provide a final or hard decision of the correct state of the data bits previously detected.

10 Claims, 2 Drawing Figures

TRIPLE BIT NON-COHERENT MATCHED FILTER RECEIVING SYSTEM

BACKGROUND OF THE INVENTION

1. Field of the Invention

This invention relates to a system for non-coherently receiving and detecting data which has been modulated onto a carrier signal. More particularly, the present invention discloses a novel apparatus for detecting data signals modulated onto a carrier without the requirement for coherent demodulation of the carrier signal.

2. Description of the Prior Art

Digital data may be phase modulated onto a carrier signal before being transmitted. The process of modulating the data signal onto the carrier signal causes phase reversal of the carrier signal making it impossible to determine the absolute phase of the carrier.

Purely coherent receiving systems provide a replica signal of the carrier signal which will permit the determination of the absolute phase of the carrier signal and thus the absolute phase of the data signal with maximum effectiveness.

In one type of prior art system known as a differentially coherent system, the data which is employed to modulate the carrier signal at the transmitter is encoded at the transmitter and then decoded at the receiver without the requirement for the determination of the phase of the carrier. It is known that differentially coherent receiving systems are less efficient than a purely coherent receiving system by approximately two decibels.

In yet another form of non-coherent receiving system, the data modulated carrier signal is encoded at the transmitter. The received encoded signals are applied to a pair of double-bit matched filters at the receiver which operate to detect and decode the incoming signal. On the basis of the absolute value of the output from the pair of double-bit matched filters, a hard or final decision is made whether the received data bit signal is representative of the presence or absence of a transition in the data stream. Systems employing double bit matched filters at the receiver also typically cause a two decibel loss of the received signal when compared to a coherent receiver.

It would be desirable to provide a non-coherent receiving system which is more efficient than the differentially coherent system receiver and other forms of non-coherent receivers known in the prior art.

SUMMARY OF THE INVENTION

It is a principal object of the present invention to provide a novel non-coherent receiving system.

It is another principal object of the present invention to provide a novel three-bit matched filter detector system which is more efficient than non-coherent receiving systems of the prior art.

It is another principal object of the present invention to provide a receiving system for detecting the presence or absence of a transition in a data modulated carrier signal.

It is another object of the present invention to provide a non-coherent receiving system that first detects a stream of data bits to make a soft decision and subsequently modifies that soft decision on the basis of data bits that are detected subsequently.

It is yet another object of the present invention to provide an improved controller circuit for storing and modifying a stream of data bits being received.

According to these and other objects of the present invention, there is provided in a non-coherent receiving system a triple bit matched filter detector which provides a best estimate and a second best estimate of the state of the data bits being detected. The output of the triple bit matched filter detectors is converted to digital information and the digital information is stored and processed to refine and to modify a soft or preliminary decision of the state of individual bits that have already been received and detected. The data stream to be modified is stored in shift registers and is shifted through the shift registers in real time while it is being modified to provide a hard decision at the output of the shift registers.

DESCRIPTION OF THE PREFERRED EMBODIMENT

Figure 1:
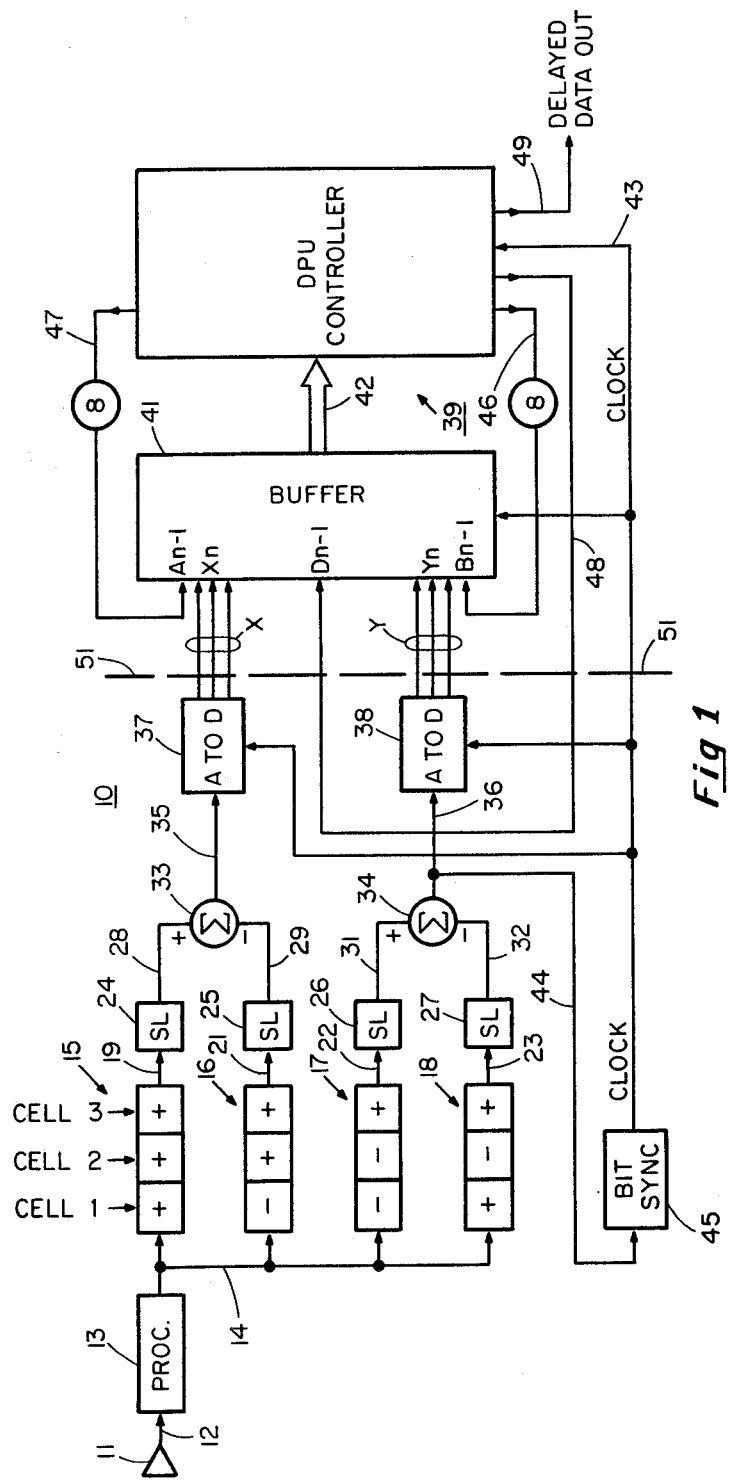
FIG. 1 is a schematic block diagram showing the novel triple bit matched filter detectors connected to a controller which is adapted to modify data bits already detected in a data stream.

Refer now to FIG. 1 showing a preferred embodiment non-coherent spread spectrum receiving system 10. The antenna 11 receives the incoming modulated signal and the output on line 12 is processed in a processor 13 to provide the proper amplitude and shape for being applied via line 14 to the input of the four triple bit matched filters 15, 16, 17 and 18. Each of the triple bit matched filters are provided with three bit cells. The alignment of the bit cells of the four triple bit matched filters are representative of all eight possible combinations of three bits of differential data. The output from the matched filters 15 to 18 is provided on output lines 19 to 23. The signal on these output lines is an amplitude modulated carrier signal representative of the state of all three cell bits of the matched filter. The signal on lines 19 to 23 is applied to the square law detectors 24 to 27 to remove the carrier signal and to provide an amplitude modulated signal on lines 28 to 32. The output from the square law detectors 24 and 25 is applied to a differential summing device 33 and the output from square law detectors 26 and 27 is applied to a differential summing device 34. The output from summing device 33 on line 35 is an analog output signal which is designated $x_n$ and represents the best estimate of the state of the bits in cells one of filters 15 and 16. The analog output signal on line 36 is designated $Y_n$ and represents the best estimate of the state of the bits in cells one of filters 17 and 18. The analog output signal on line 35 is applied to an analog to digital converter 37 to provide a three-bit digital word $X_n$ representative of the amplitude of the signal on line 35. In similar manner, the analog output signal on line 36 is applied to analog to digital converter 38 to provide a three-bit digital signal $Y_n$ representative of the analog signal on line 36.

For purposes of better explaining a preferred embodiment mode of operation of the controller 39, an external buffer 41 is shown connected to the data processing unit of controller 39 by bus 42. Buffer 41 contains a plurality of shift registers (not shown specifically). One eight-bit shift register in buffer 41 contains a word $A_{n-1}$ which is representative of the best estimate of a plurality of data bits which have been detected before the bit being detected in cell one of matched filters 15 and 16. Another of the eight-bit shift registers contains a word $B_{n-1}$ which is representative of the next best estimate of a plurality of data bits which have been detected before the bit being detected in cell one of matched filters 17 and 18. As already explained, the values $X_n$ and $Y_n$ are three-bit digital signals and they are also stored in three-bit shift registers of the buffer 41. The last of the signals shown being stored in buffer 41 is shown as a digital signal $D_{n-1}$. This signal which is being processed is stored in a six-bit shift register and is representative of a probability that a transition has occurred or has not occurred at cell one of the matched filters 15 to 18.

In order to initiate the operation of the system, it is necessary to make several assumptions. Since there is no data stream being initially stored in the A register, the A register may be filled with all ones. Initially, since there is no data stream available, the B register may be filled with all zeros. Also, the probability of a one or a zero being in any cell is fifty percent the D register may be loaded with a one followed by five zeros. In this initial state of readiness, the controller 39 will be operated under a real time operation timed by a clock signal on line 43. The clock signal may be derived from either line 35 or 36. In the present embodiment, a line 44 connected to line 36 serves as an input to a bit synchronizer 45 to provide the clock signal on line 43.

Assume that the digital values of D, A, B, X and Y are known and available to controller 39 via bus 42. Using this information stored in buffer register 41, it is now possible to sense during each clock time or bit time new values of X and Y and to calculate new values of A, B and D.

Thus, it will be understood that at bit time zero a digital value representative of $A_0$, $B_0$ and $D_0$ are stored in their respective shift registers. One bit time later, digital values of $A_1$, $B_1$, $D_1$ are being stored in the same shift registers to enable the calculation of the next digital values representative of $A_2$, $B_2$ and $D_2$ ad infinitum out to $A_n$, $B_n$ and $D_n$ bit times.

In the preferred mode of operation the next eight-bit digital value of A is calculated as follows:

(1) Insert a "1" in the most recent or lowest order position.

(2) Take the next seven bits from the present A value to complete the next value of A if X(D) is greater than Y(1−D) where X and Y are present sensed values and D is a previously calculated value.

(3) Take the next seven bits from the present B value to complete the next value of A if X(D) is less than Y(1−D) where X and Y are presently sensed values and D is a previously calculated value.

In the preferred mode of operation, the next eight-bit digital value of B is calculated as follows:

(1) Insert a "0" in the most recent or lowest order bit position.

(2) Take the next seven bits from the present B value to complete the next value of B if (1−X)D is less than (1−Y) (1−D) where X and Y are presently sensed values and D is a previously calculated value.

(3) Take the next seven bits from the present A value to complete the next value of B if (1−X)D is greater than (1−Y) (1−D) where X and Y are presently sensed values and D is a previously calculated value.

In the preferred embodiment mode of operation, the next six bit digital value of D is taken to be equal to the greater of the product of (X−1) (D−1) or (Y−1) (1−D) where X and Y are presently sensed values and D is a previously calculated value.

The purpose of examining and calculating new A and B digital values at each clock time is to determine the highest probability of the correct value of the highest order bits of both the A and B values. As the bits in the A and B registers are examined and modified, the values of the highest order bits of both the A and B values are merged or become identical. At the time the next A value is calculated, the highest order bit can be read out as the correct value of the bit of the data stream. Thus, it will be understood that the correct data bit stream is being read from the highest order bit of the A value, which in the present invention, should be the same as the highest order bit of the B value.

The system operates in a mode where a best soft decision is made concerning the data stream being detected and that best soft decision is refined to produce the final or hard correct decision. If there is an error in the received data, the system is not designed to correct the error, however, the final decision data bits that are being generated serially may be processed through an error correction circuit if required.

At each clock time, the controller 39 is generating a new B value on line 46. The new A value is generated on line 47. The new D value is generated on line 48 and at each clock time. The clock on line 43 is reading out a final decision data bit on line 49. For purposes of explanation of this invention, the elements and structure shown to the right of line 51 comprise the controller means.

Figure 2:
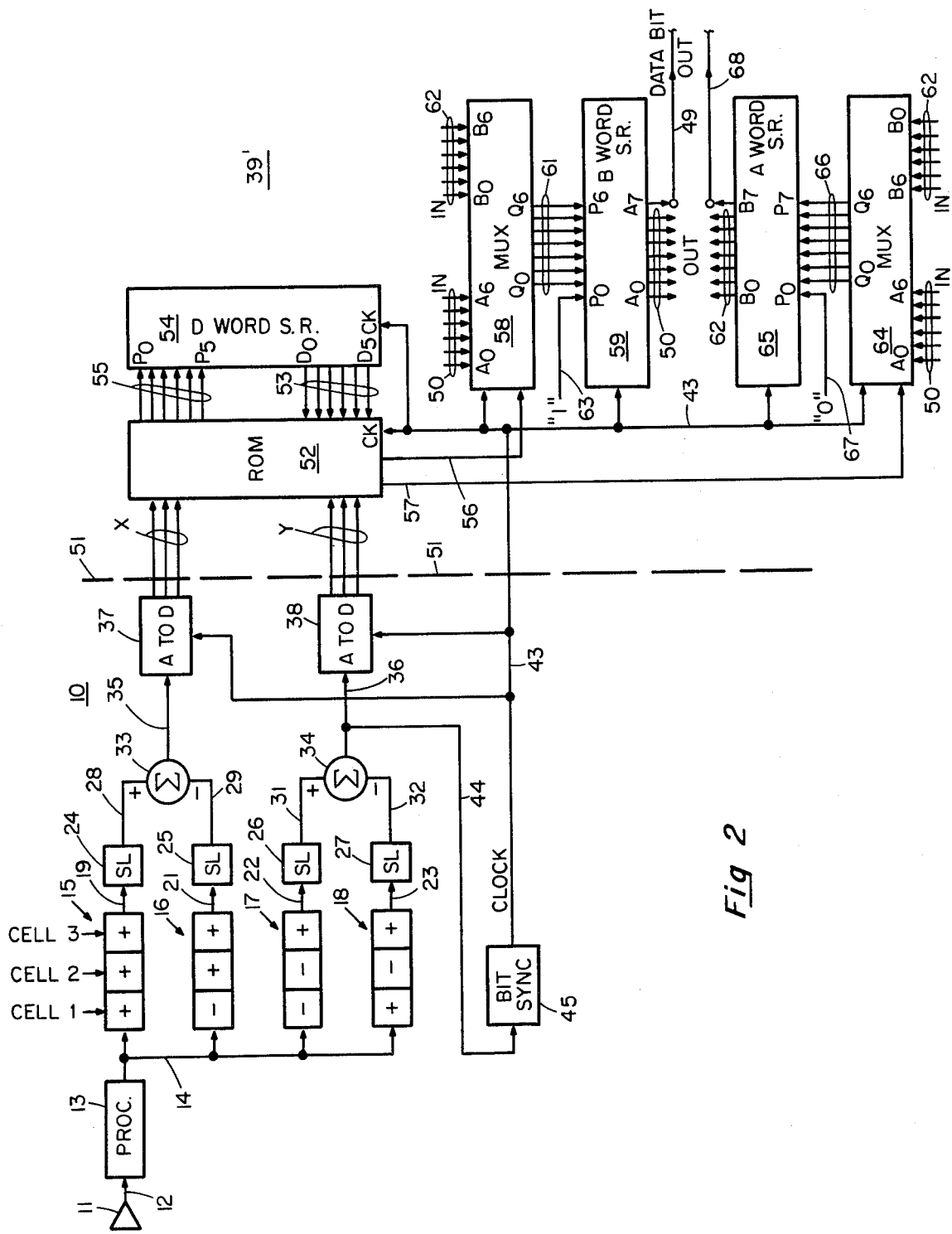
FIG. 2 is a schematic block diagram showing the novel triple bit matched filter detectors connected to a simplified form of a controller which is adapted to modify data bits in a data stream as they are passed through the shift registers.

Refer now to FIG. 2 showing a modified form of controller means to the right of line 51. The detectors and the detector system to the left of line 51 in both FIGS. 1 and 2 are identical and have been numbered the same. Thus, the operation of the detector system also provides two sets of three parallel lines on which the digital values of X and Y are present.

The X and Y value inputs to read only memory (ROM) 52 comprise six digits of a twelve-bit address. The other six bits of the twelve-bit address are provided on lines 53 from shift register 54 which represent the present digital values of D. This probability value D has been explained hereinbefore. The twelve-bit word addresses an eight-bit memory location in ROM 52 in which has been stored the proper next six-bit digital value of D. This next six-bit value of D is provided as an output from the ROM 52 on lines 55 to shift register 54. The remaining two bits of the value stored in the addressed memory location are provided as outputs on lines 56 and 57 respectively. The value on line 56 can only be a high or a low bit value. When the bit is high and applied to multiplexer 58, it causes the present highest order bits of the value of A on lines 50 to pass into the multiplexer 58 and be presented as signals at the $Q_0$ to $Q_6$ outputs of multiplexer 58. The $Q_0$ to $Q_6$ outputs from multiplexer 58 are connected to the $P_1$ to $P_7$ highest order bit inputs of the A value shift register 59 via lines 61. When the value on line 56 is a low bit value, it will cause the present highest order bits of the value of B on lines 62 to be applied to the multiplexer 58 and presented via lines 61 to the shift register 59. A one-bit is inserted via line 63 into the $P_0$ position of the A word shift register 59 to complete the next A word. Thus, it will be understood that the new or next A word is being presented at output lines 50 and that the highest order bit indicative of the bit of the data stream is presented at the $A_7$ highest order position and is connected to output line 49.

In similar manner, the value on line 57 can only be a high or a low bit value. When the bit is high on line 57 to multiplexer 64, it causes the present seven highest order bits of the A word on lines 50 to be passed into the multiplexer 64 and to be presented at its output positions $Q_0$ to $Q_6$. The $Q_0$ to $Q_6$ output positions of multiplexer 64 are connected respectively to the $P_1$ to $P_7$ input positions of the B word of shift register 65. The $P_1$ to $P_7$ positions of shift register 65 are connected to the $B_1$ to $B_7$ output positions of shift register 65 and are presented as outputs on lines 62. A zero bit is inserted via line 67 to the $P_0$ position of the B word shift register 65 to complete the B word on lines 62. When the value on line 57 is a low bit value, the present value of the highest order bits of the B word on lines 62 is applied as an input to the multiplexer 64 and provided at the outputs $Q_0$ to $Q_6$. The value of B at the outputs $Q_6$ to $Q_7$ are applied to the $P_1$ to $P_7$ inputs of the B word shift register 65 via lines 66. The zero bit on line 67 is applied to the $P_0$ position to complete the new or next B value on lines 62 at the output of shift register 65.

The data bit at the $B_7$ output of the B word shift register 65 on line 68 is available as a data output. The stream of data bits on line 68 should be the same as the data bits available on line 49.

Having explained a preferred embodiment invention employing a computer in the controller 39 and a hardware implementation controller 39' using shift registers, multiplexers and a read only memory employed as a look-up table, it will be understood that all of the range of values representative of all values of X, Y and D as a twelve-bit address can be addressed by ROM 52. The new D value is stored in ROM 52 which is available on output lines 55. The new values of A and B are constructed at the A and B word shift registers without the necessity of an arithmetic unit or a processor in the controller 39'.

Once the value of the initial A and B words are effectively shifted through the A and B word shift registers, the highest order bits appearing on data output lines 49 are the best hard decision of previously sensed data bits at cells one of the matched filters 15 and 16. The best soft decision sensed at cells one of matched filters 15 and 16 can be modified while being shifted through the A and B word shift registers 59 and 65. A preferred mode of modifying the soft decision non-coherent detection of the data bit stream into a hard decision based on data bits subsequently sensed represents a more accurate method of detecting data which is fully one order of magnitude (or one decibel) better than the prior art non-coherent receiving systems. The prior art differentially coherent detection systems lose up to two decibels over the totally coherent systems whereas the improved differentially coherent detection system has only about one decibel loss when employed to de-modulate digital data.

Having explained an improved system for the demodulation of digital data employing four triple bit matched filters, it will be understood that larger cell length matched filters could be employed with slight improvements in the detection of data bits. Since the number of matched filters is equal to $2^{n-1}$, where n is the number of cells in a filter, the complexity of the decision making process and associated hardware would also increase exponentially. Thus, the present detection system which employs a best decision and a second best decision represents a preferred mode of operation where the cost, weight and complexity of the hardware is a primary consideration.

I claim:

1. A system for refining the non-coherent detection of data bits in a stream of data bits modulated onto a carrier signal, comprising:

means for receiving said data bits, a plurality of matched filters coupled to said received data bits, detector means coupled to the outputs of each of said matched filters for providing an absolute value voltage output, a first summing device coupled to a first predetermined pair of said matched filters for providing a voltage value of a best soft decision of the data bit being detected, a second summing device coupled to a second predetermined pair of said matched filters for providing a voltage value of a second best soft decision of the data bit being detected, first and second analog to digital converter means for converting the voltage value outputs of said first and second summing devices to digital values X and Y, storage means for storing the digital values of X and Y, storage means for storing the best decision of digital values A of the stream of data bits previously detected, storage means for storing the second best decision of digital values B of the stream of data bits previously detected, storage means for storing a digital value D representative of a calculated probability factor, and controller means, including clock means and comparison means for making predetermined sets of calculations employing X, Y, D, A and B to provide new digital values of D, A and B and for changing the lower order bits of the values of A and B to provide a final hard decision of the value of the highest order bit of A which is representative of the best hard decision of the value of a bit detected before the X and Y bits were detected.

2. A system as set forth in claim 1 wherein said controller comprises a digital processing unit of the type adapted to perform a sequence of mathematical operations on the values of stored digital data and to replace the previously stored digital data with new digital data.

3. A system as set forth in claim 1 wherein said controller comprises a read only memory, and wherein said read only memory is addressed by predetermined digital values of X, Y and D to provide an output indicative of new digital values of $A_{n+1}$ and $B_{n+1}$.

4. A system as set forth in claim 3 wherein the storage means comprise, an A shift register storage means for storing said digital values A, a B shift register storage means for storing said digital values B, and a D shift register storage means for storing said digital value D.

5. A system as set forth in claim 4 which further includes, a first multiplexer having a shifted output coupled to the input of said A shift register storage means, and a second multiplexer having a shifted output coupled to the input of said B shift register storage means.

6. A method of improving the accuracy of detecting a stream of transmitted data bits modulated onto a carrier signal, comprising the steps of:

applying the data modulated carrier signal to a plurality of matched filters to non-coherently detect a plurality of different absolute analog voltage values, summing the absolute voltage values of predetermined pairs of said matched filters, converting the sums of said predetermined pairs of said matched filters from analog to digital values $X_n$ and $Y_n$, storing the values of a first plurality of previously detected digital bits to form a word $A_n$ representative of a best soft decision of data transitions that have previously occurred, storing the value of a second plurality of previously detected digital bits to form a word $B_n$ representative of a second best soft decision of data transitions that have previously occurred, calculating the digital value of a probability number $D_n$ which is equal to $(X_{n-1})(D_{n-1})$ indicative of the probability that the next lower order bit was a "1" bit, calculating the digital value of $X_n(D_n)$, calculating the digital value of $Y_n(1-D_n)$, determining whether $X_n(D_n)$ is greater than or smaller than $Y_n(1-D_n)$, selecting the highest order bits of $A_n$ for a new word $A_{n+1}$ when $X_n(D_n)>Y_n(1-D_n)$, selecting the highest order bits of $B_n$ for a new word $A_{n+1}$ when $X_n(D_n)>Y_n(1-D_n)$, inserting a "1" bit in the lowest order bit position of the selected $A_{n+1}$ highest order bits to form a new word $A_{n+1}$, calculating the digital value of $(1-D_n)(1-X_n)$, calculating the digital value of $(1-D_n)(1-Y_n)$, determining whether $D_n(1-X_n)$ is greater than or smaller than $(1-D_n)(1-Y_n)$, selecting the highest order bits of $A_n$ for a new word $B_{n+1}$ when $D_n(1-X_n)>(1-D_n)(1-Y_n)$, selecting the highest order bits of $B_n$ for a new word $B_{n+1}$ when $D_n(1-X_n)<(1-D_n)(1-Y_n)$, inserting a "0" bit in the lowest order bit position of the selected $B_{n+1}$ highest order bits to form a new word $B_{n+1}$, and removing the highest order bit of the new word $A_{n+1}$ as the confirmed hard decision for the data bit that was previously transmitted.

7. A method of improving and verifying the accuracy of detection of a stream of transmitted data bits modulated onto a carrier signal, comprising the steps of:

applying the data modulated carrier signal to a plurality of triple bit matched filters, detecting the absolute voltage output from each triple bit matched filters, summing the absolute voltage output from a predetermined pair of said matched filters to form a best soft decision voltage of the state of the data bit which has just occurred based on the two data bits which have previously occurred, summing the absolute voltage output from another predetermined pair of said matched filters to form a second best soft decision voltage of the state of the data bit which has just occurred based on the two data bits which have previously occurred, converting said best soft decision voltage of the state of the data bit to a digital value $X_n$, converting said second best soft decision voltage of the state of data bit to a digital value $Y_n$, calculating a digital value of a probability number $D_n$ which is equal to $(X_{n-1})(D_{n-1})$, storing in a register a digital value $A_n$ representative of a best soft decision of the values of the transmitted data bits, storing in a register a digital value $B_n$ representative of a second best soft decision of the values of the transmitted data bits, calculating a new digital value $A_{n+1}$ by comparing the values of $X_n$, $Y_n$ and $D_n$ in a predetermined relationship, inserting a "1" bit in the lowest order bit position of the digital value $A_n$, and removing the highest order bit of the new digital value $A_{n+1}$ as the confirmed hard decision for the data bit that was previously transmitted.

8. A method as set forth in claim 7 which further comprises the steps of calculating a new digital value $B_{n+1}$ by comparing values of $X_n$, $Y_n$ and $D_n$ in a predetermined relationship, inserting a "0" bit in the lowest order bit position of the digital value $B_n$, and removing the highest order bit of new digital value $B_{n+1}$.

9. A method as set forth in claim 8 wherein the highest order bits of the digital value of $B_n$ are substituted for the highest order bits of the new digital value $A_{n+1}$ when the value of $X_n(D_n)<Y_n(1-D_n)$.

10. A method as set forth in claim 8 wherein the highest order bits of the digital value of $A_n$ are substituted for the highest order bits of the new digital value $B_{n+1}$ when the value of $D_n(1-X_n)>(1-D_n)(1-Y_n)$.

* * * * *